July 15, 1924.
W. A. CHRYST
1,501,520
STARTING AND GENERATING SYSTEM
Filed March 22, 1920     7 Sheets-Sheet 2
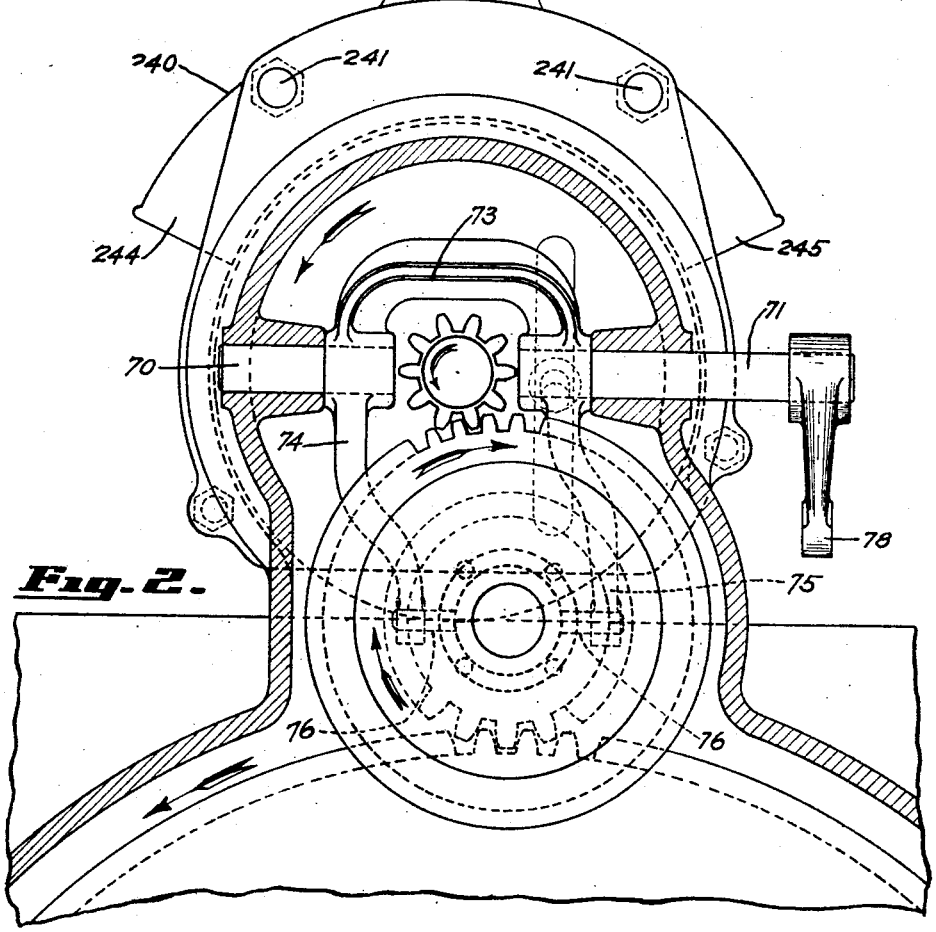
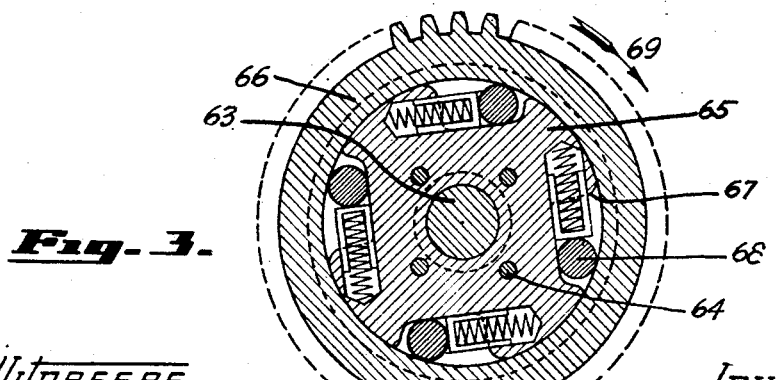

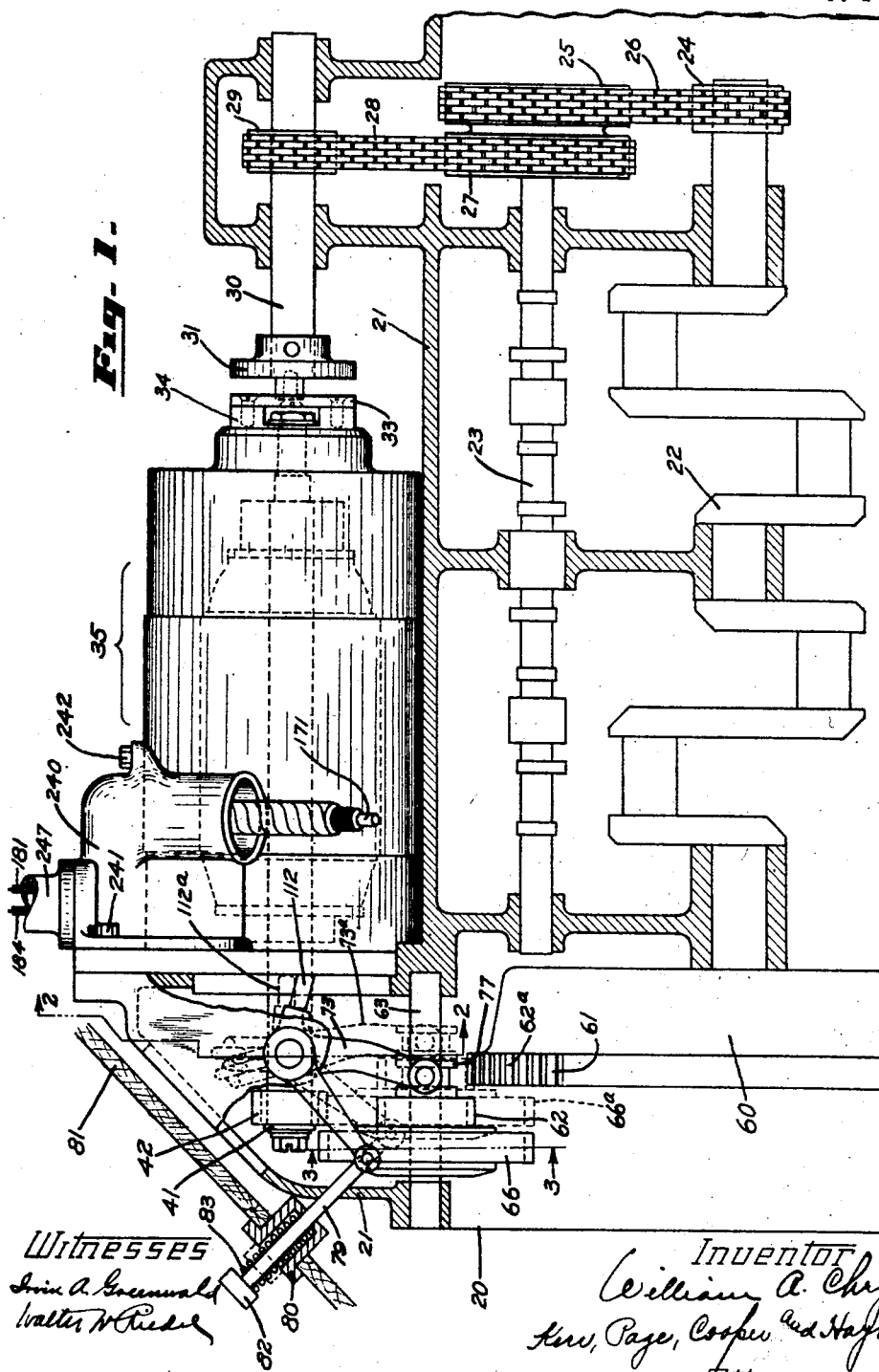

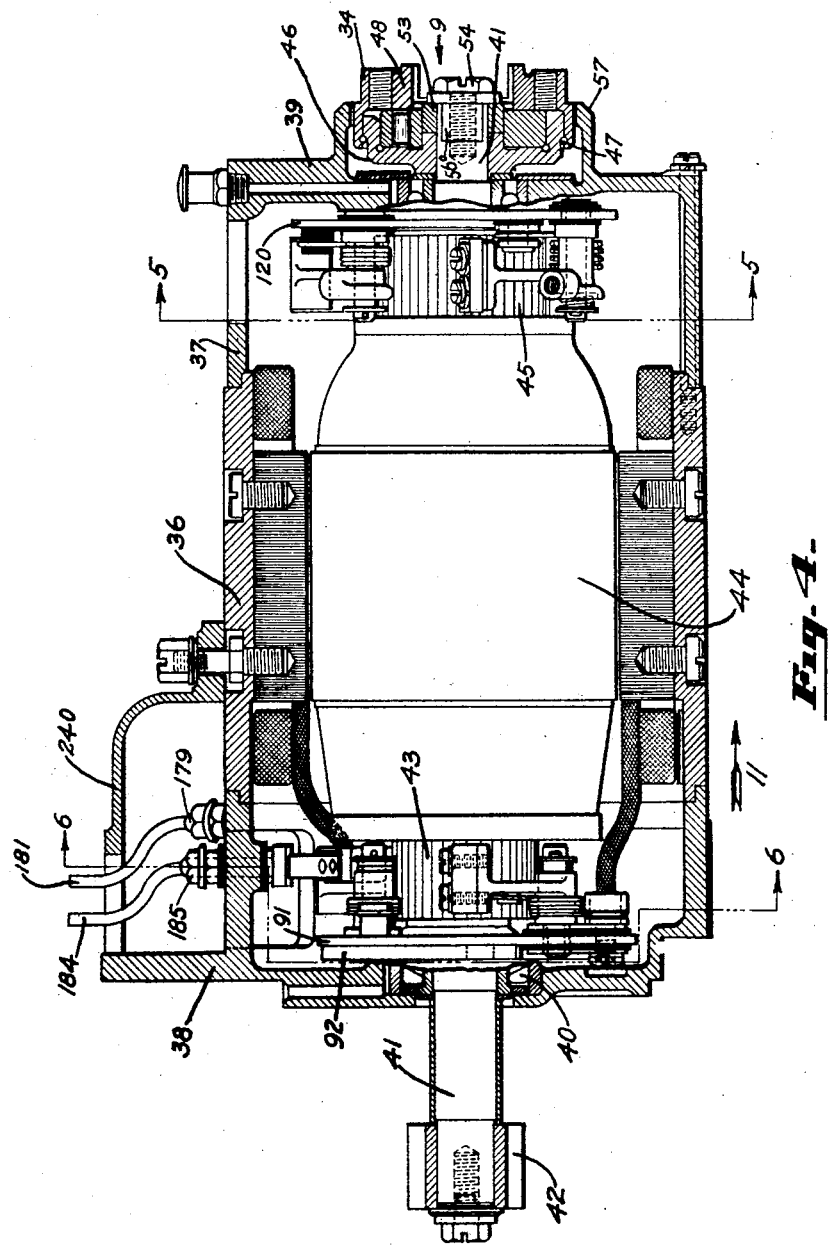

July 15, 1924.
W. A. CHRYST
1,501,520
STARTING AND GENERATING SYSTEM
Filed March 22, 1920 7 Sheets-Sheet 5
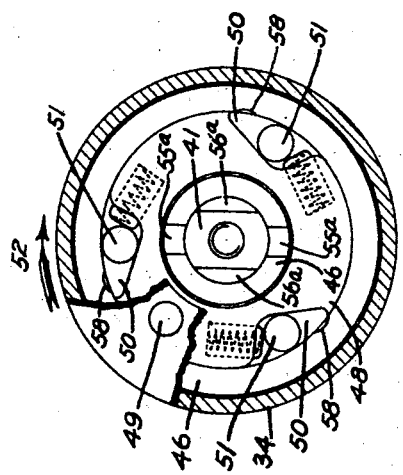
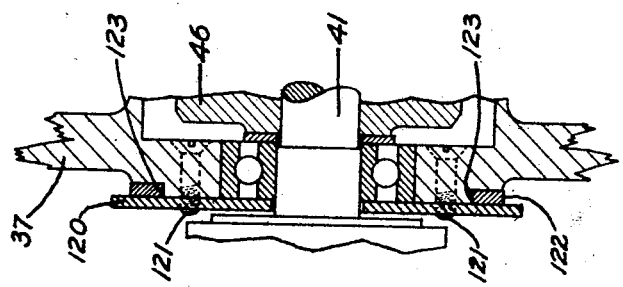
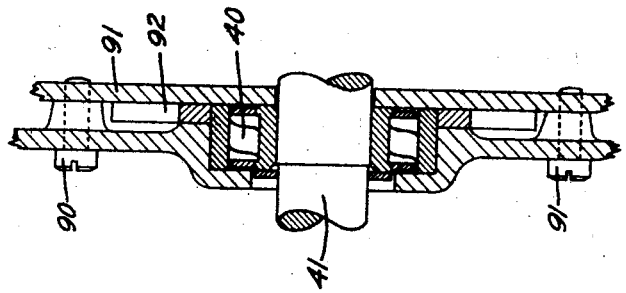
Witnesses
Inventor
William A. Chryst
Kerr, Page, Cooper and Hayward
Attorneys July 15, 1924.

W. A. CHRYST 1,501,520

STARTING AND GENERATING SYSTEM

Filed March 22, 1920 7 Sheets-Sheet 6

Witnesses

Inventor
William A. Chryst
Kerr, Page, Cooper and Hayward
By
Attorneys.

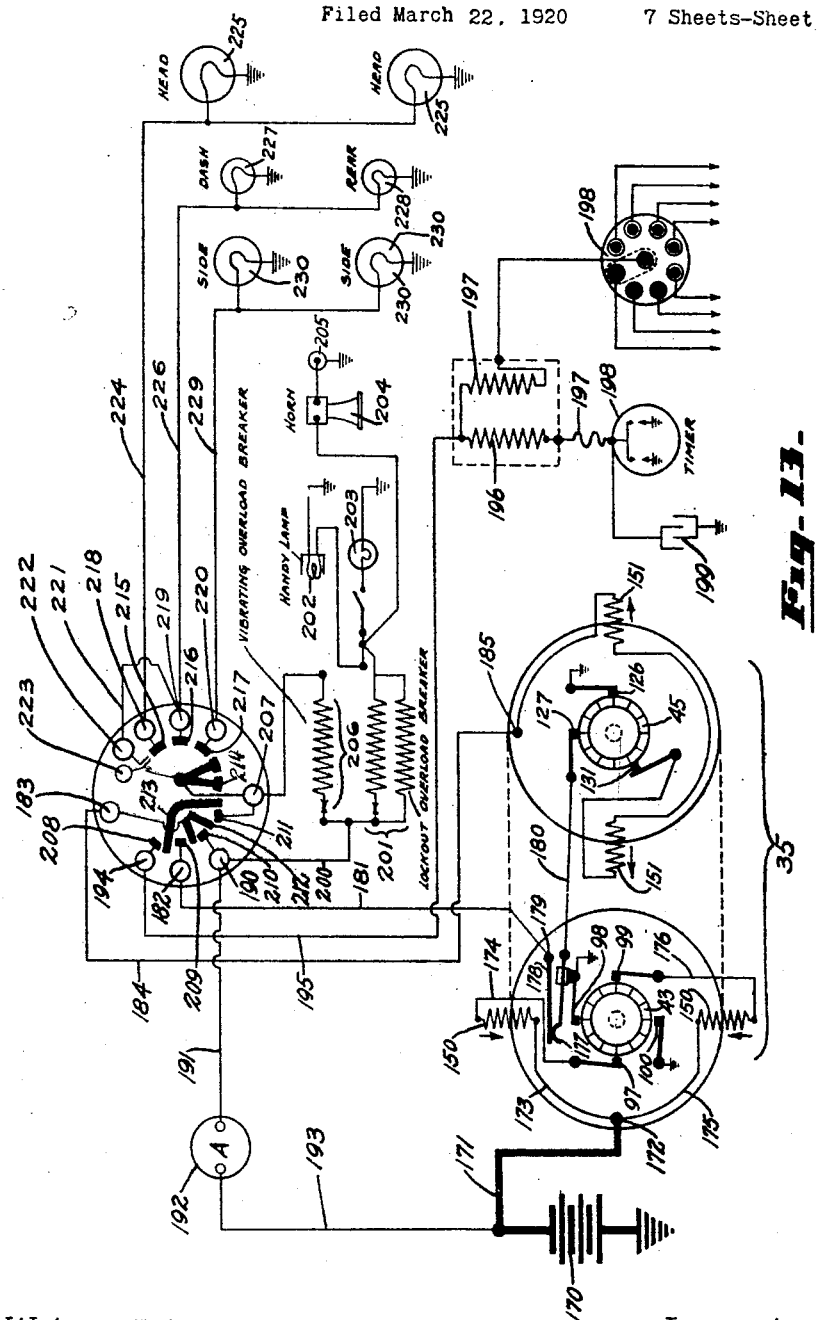

Patented July 15, 1924.

1,501,520

UNITED STATES PATENT OFFICE.

WILLIAM A. CHRYST, OF DAYTON, OHIO, ASSIGNOR TO THE DAYTON ENGINEERING LABORATORIES COMPANY, A CORPORATION OF OHIO.

STARTING AND GENERATING SYSTEM.

Application filed March 22, 1920. Serial No. 367,631.

*To all whom it may concern:*

Be it known that I, WILLIAM A. CHRYST, a citizen of the United States of America, residing at Dayton, county of Montgomery, State of Ohio, have invented certain new and useful Improvements in Starting and Generating Systems, of which the following is a full, clear, and exact description.

This invention relates to electrical systems particularly adapted for automotive vehicles, and including a dynamo-electric-machine capable of operation as a motor to start the engine, and operable when driven by the engine as a generator for battery charging purposes.

This invention has generally among its objects the provision of improvements in the engine starting system described and claimed in the patent to Charles F. Kettering and William A. Chryst, No. 1,303,831, issued May 13, 1919.

In particular, this invention has among its objects to increase the efficiency of the dynamo-electric-machine whereby its size and its cost of manufacture may be reduced.

A further object of the invention is to eliminate as far as possible without sacrifice of efficiency the humming noise which occurs during the rapid rotation of the armature of the dynamo-electric-machine.

A further object of the invention is to provide improved means for controlling the circuit connections between the battery and dynamo-electric-machine.

A further object is to provide improved means for adjusting the regulating or third brush included in the generating circuit of the dynamo-electric-machine.

A further object of the invention is to provide improved means for enclosing the terminals of the dynamo-electric-machine whereby to render them the least exposed to dirt and moisture.

Further objects and advantages of the present invention will be apparent from the following description, reference being had to the accompanying drawings, wherein a preferred embodiment of the present invention is clearly shown.

In the drawings:

Fig. 1 is a fragmentary sectional view of an internal-combustion engine showing the portion of the crank case in section together with the side elevations of the crank shaft and cam shafts of the engine. Fig. 1 shows also a side elevation of a dynamo-electric-machine embodying the present invention together with the mechanical connections adapted to connect the machine with the engine for engine starting or generating purposes;

Fig. 2 is a fragmentary sectional view on an enlarged scale taken on the line 2—2 of Fig. 1, the gearing however, being shown in end elevation;

Fig. 3 is a sectional view of one of the gears, the section being taken on the line 3—3 of Fig. 1;

Fig. 4 is a longitudinal sectional view on the same scale as Figs. 2 and 3 of the dynamo-electric-machine shown in Fig. 1, the brush rigging being shown in side elevation;

Fig. 7 is a fragmentary longitudinal sectional view on an enlarged scale of the machine shown in Fig. 4, certain parts being omitted for the sake of clearness. This section shows the method of mounting the motor brush bracket and motor brush cam plate;

Fig. 8 is a fragmentary sectional view on an enlarged scale of certain parts shown in Fig. 1, said view showing the method of mounting the generator brush brackets;

Fig. 9 is an end view on an enlarged scale of the generator clutch looking in the direction of the arrow 9 of Fig. 4, certain parts being shown in section;

Fig. 10 is a perspective view on an enlarged scale of the driving washer shown in section in Fig. 4;

Fig. 13 is a wiring diagram showing an electrical system embodying the present invention.

Figure 5:
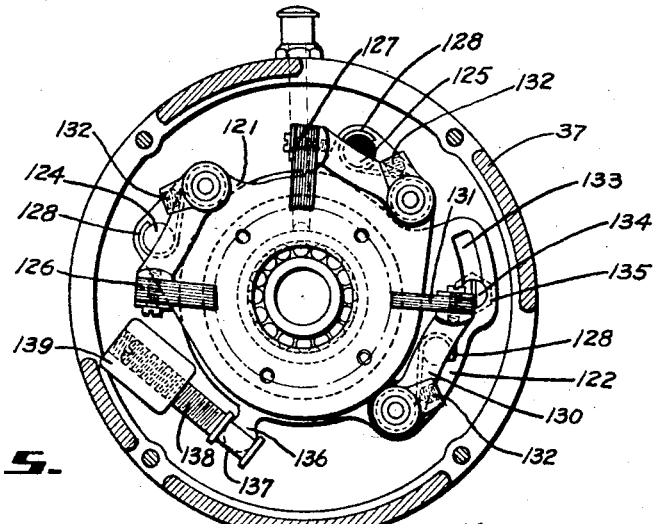
Fig. 5 is a sectional view taken on the line 5—5 of Fig. 4, the armature being omitted for the sake of clearness.

Referring to the drawings, the internal-combustion engine 20, the cylinders of which are omitted for the sake of clearness, includes a crank case 21 within which are journalled crank shaft 22 and cam shaft 23 which are connected together by means of timing gears 24 and 25 and chain 26. Shaft 23 carries also a gear 27 driving, through chain 28, a gear 29 mounted on shaft 30. Shaft 30 carries a coupling element 31 to which is attached a flexible coupling element 33, which is in turn attached to a clutch element 34.

The dynamo-electric-machine, designated as a whole by numeral 35 includes a field frame 36 and end frames 37 and 38. Frames 37 and 38 support bearings 39 and 40, respectively, upon which is journalled the armature shaft 41 which supports, reading from left to right in Fig. 4, pinion 42, motor commutator 43, armature 44, generator commutator 45 and a clutch shell element 46. The coupling member 34 surrounds the outer cylindrical surface of the clutch shell 46 and is retained in position by means of a split spring ring 47. A clutch cam 48 is attached to coupling 34 by means of rivets one of which is shown at 49 and is journalled within shell 46. Cam 48 is provided with notches 50 in which are located spring pressed rollers 51 which cooperate with elements 48 and 46 so as to drive the clutch ring 46 when the coupling member is rotated in the direction of the arrow 52 of Fig. 9. Driving connection from the clutch 46 to the armature shaft 41 is effected by means of a driving washer 53 which is mounted upon the shaft 41 and is held in position by means of a screw 54. Washer 53 is provided with lugs 55 which enter notches 55ª provided in the hub of member 46, and is provided with flat surfaces 56 which cooperate with corresponding flat surfaces 56ª provided on the shaft 41. The end frame 37 is provided with an annular boss 57 which extends out from the coupling element 34 and serves to provide a dust-proof enclosure for the overrunning clutch.

The clutch ring 46 is provided with notches 58 which cooperate with the rollers 51 to produce a clicking sound which serves as a signal in the manner described and claimed in the patent to Charles F. Kettering and William A. Chryst No. 1,311,402, issued July 29, 1919.

The crank shaft 22 drives the engine flywheel 60 which is provided with a flywheel gear 61 adapted to mesh with gear 62 which is slidably mounted upon a rod 63, and which is connected by means of rivets 64, see Fig. 3, with a clutch cam 65, supporting a ring gear 66. Clutch cam 65 is provided with notches 67 in which are located spring pressed rollers 68 by means of which a driving connection from the ring gear 66 to the clutch cam 65 is effected when the ring gear 66 revolves in the direction of the arrow 69 of Fig. 3. The ring gear 66 is adapted to engage the motor pinion 42.

To effect the connection between the machine 35 and the flywheel gear 61, the crank case 21 supports stub shafts 70 and 71, see Fig. 2, which support a shifting yoke 73 provided with arms 74 and 75 each of which carries at its lower end a shifting pin 76 cooperating with a grooved sleeve 77 which is attached to the gears 62 and 66. The stub shaft 71 carries a lever 78 which is connected with a pedal 79 passing through a bushing 80 adapted to be mounted upon the floor board 81 of an automobile. Pedal 79 terminates in a head 82, and a spring 83 is located between the head 82 and the bushing 80 for the purpose of maintaining the gearing in the position shown in full lines in Fig. 1.

Figure 6:
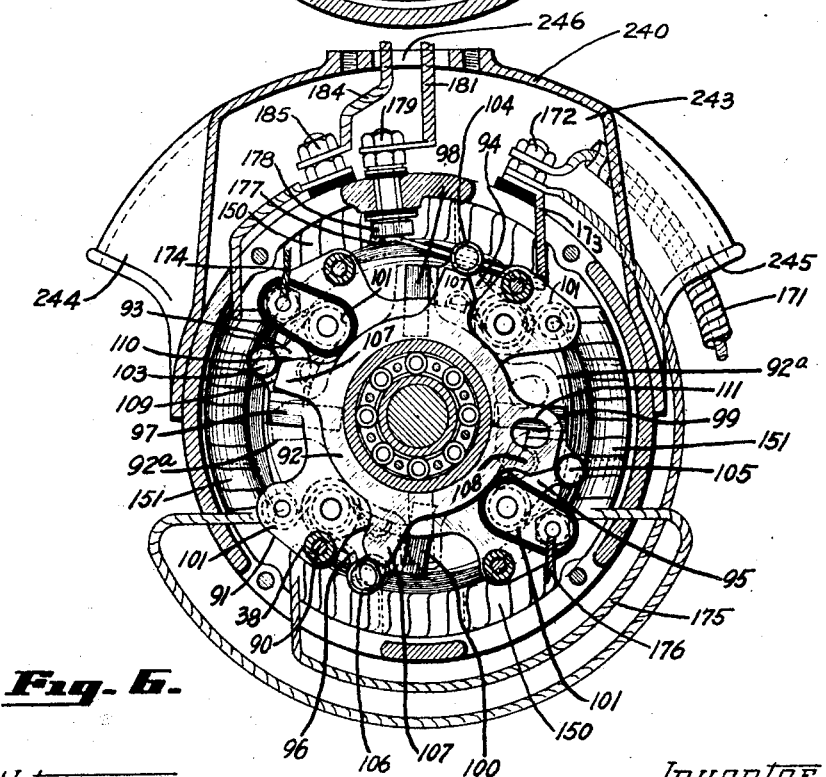
Fig. 6 is a sectional view taken on the line 6—6 of Fig. 4.

Referring to Figs. 4, 6 and 7, the end frame 38 supports, by means of screws 90, motor brush bracket 91 which retains in position motor brush cam 92 which is pivotally mounted upon the outer race of bearing 40. Brush bracket 91 supports brush arms 93, 94, 95 and 96. The brush arms 93 and 95 are insulated from the bracket 91 in any suitable manner, while the brush arms 94 and 96 are grounded upon the bracket 91. Brush arms 93, 94, 95 and 96 carry, respectively, motor brushes 97, 98, 99 and 100 which cooperate with the motor commutator 43. Springs 101 yieldingly urge the motor brushes toward the commutator. Brush arms 93 to 96 carry rollers 103 to 106, respectively, the rollers 103 and 105 being insulated. The brush cam plate 92 is provided with projections 107 and 108 each of which is provided with a stop surface 109 and with a camming surface 110. The projection 108 is provided with a slot 111 adapted to cooperate with a rod 112 carried by the shifting yoke 73.

Referring to Figs. 4, 5 and 8, the generator main brush bracket 120 is attached to the end frame 37 by means of screws 121 and retains in position a shiftable regulating brush bracket 122 which is journalled upon an annular boss 123 provided upon the end frame 37. Brush bracket 120 supports brush arms 124 and 125 which carry generator main brushes 126 and 127 respectively. Brush arm 125 is insulated from brush bracket 121 while brush arm 124 is grounded thereon. Springs 128 yieldingly maintain brushes 126 and 127 in engagement with the generator commutator 45. The regulating brush bracket 122 supports brush arm 130 carrying the regulator brush 131 maintained in yielding engagement with the commutator 45 by means of a spring 128. Each of the brush arms 124, 125 and 130 is provided with the tapped hole 132 adapted to receive a screw by means of which electrical connections may be made with the brushes. Bracket 122 is provided with an arcuate slot 133 through which passes a bolt 134, and said bolt 134 passes through the end frame 37 and cooperates with a nut 135. Bracket 122 is provided with a projection 136 which cooperates with a groove 137 formed upon an adjusting screw 138 having threaded engagement with a hole tapped into a boss 139 projecting from the end frame 37. By loosening the nut 135, and then by turning the adjusted screw 138, the bracket 122 and the regulating brush 131 may be moved angularly with respect to the main generator brushes 126 and 127. This adjustment is made for the purpose of varying the third brush regulating characteristic of the generator.

Referring to Figs. 4, 6, 11 and 12, the dynamo field frame 36 supports equally spaced pole pieces 140. Each pole piece 140 includes a core portion 141, and a substantially arrow shape shoe having a notched leading pole tip 142 and a pointed trailing pole tip 144, the contour of which conforms with the contour of the next adjacent notched leading pole tip 142. The pole tip 142 is termed a leading pole tip for the reason that it is the first part of the pole to be met by an armature core tooth, the rotation being in the direction of the arrow 145 in Fig. 12 and the arrow 146 in Fig. 11.

The core portions 141 are made comparatively wide while the shoe portions are comparatively thin in order to control the magnetic field as will be described more fully hereinafter.

The poles 140 are spaced so that when an armature core tooth is leaving a trailing tip it is beginning to enter under a leading tip, for a purpose to be explained.

The radius of curvature of a pole shoe is greater than the armature in order to provide that the air gap length shall gradually increase as a portion of the armature moves away from a pole core.

Figure 11:
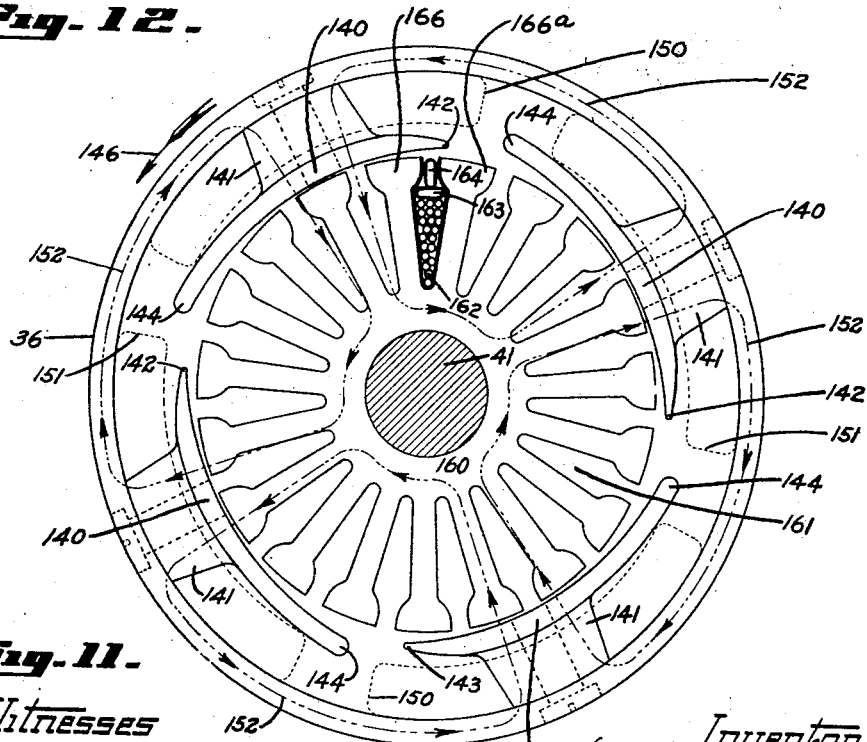
Fig. 11 is an end elevation on an enlarged scale of the motor field frame looking in the direction of the arrow 11 of Fig. 4, together with a sectional view of the armature, the armature windings being shown in one slot only for the sake of clearness.

Diametrically opposite pole pieces 140 support the motor field windings 150, which are wound to produce like magnetic polarity with reference to the armature. The other two diametrically opposite pole pieces 140 support generator field windings 151 which are wound to produce like magnetic polarity but a polarity which is opposite to that produced by the motor field windings 150. Each set of windings, therefore, produces a magnetic field represented diagrammatically by the dot and dash lines 152, the direction of magnetic flux, for example, being in the direction of the arrow heads shown thereon. The motor field windings and the generator field windings both produce a similar magnetic field, and, therefore, the generator field windings are adapted to assist the motor field windings under certain circumstances as will be explained later. In Fig. 11, the field windings are represented by dotted lines for sake of clearness.

Figure 12:
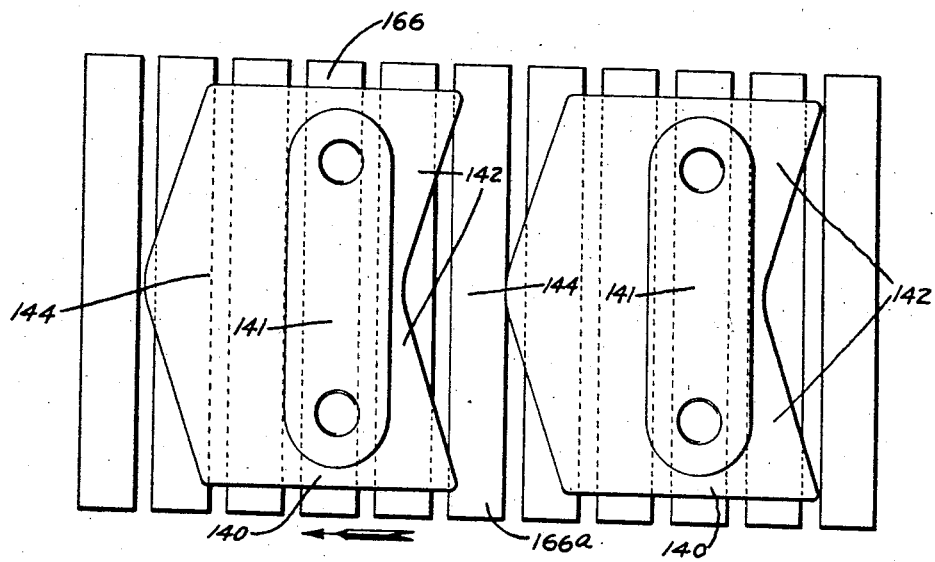
Fig. 12 is a diagrammatic view showing the relation of the armature core teeth to the field pole pieces.

The armature 44 is not of itself my invention but is described and claimed in the copending application of Nelson R. Haas, Serial No. 310,789, filed July 14, 1919. The armature 44 comprises a series of superimposed core laminæ 160, one of these laminæ being shown in end elevation in Fig. 11. The laminæ 160 are provided with open slots 161 which are approximately bottle shaped to provide a relatively great winding space for the generator armature conductors 162 and for one of the motor armature conductors 163, and with a relatively narrow neck in which another motor armature conductor 164 may be located. By providing the laminæ 160 with such slots the core teeth 165 are provided with relatively wide tips 166, which tend to concentrate the lines of force in such a manner that more of the magnetism goes into the armature core and less of it is lost in the air. In Fig. 12 these core tips 166 are represented diagrammatically by rectangles. Both the generator conductors and the motor conductors are drum wound upon the core and are preferably pitched six core slots, that is, the branches of the loop forming each conductor are located so that there are four slots intervening. This is the preferable location for a 19 slot armature core, such as shown in Fig. 11. The terminals of each of the motor and generator armature conductors are connected with commutator bars located substantially 180° apart. In this manner the motor and generator windings are arranged for a four pole operation, exactly as though during the entire motor operation or generator operation of the dynamo each of the four pole pieces were provided with an active field winding.

Referring to the wiring diagram in Fig. 13 a battery 170, which is grounded, is connected by wire 171 with terminal 172 with which two parallel circuits are connected. One circuit includes wire 173 and one of the motor field windings 150, wire 174 and brush 97; and the other circuit includes wire 175 and the other motor field winding 150, wire 176 and brush 99. The motor circuit includes grounded brushes 98 and 100. These motor brushes are normally held out of engagement with the motor commutator 43 by means of the brush cam plate 92.

Referring again to Fig. 6 the brush arm 94 supports a movable but insulated contact 177 cooperating with a stationary contact 178, forming a part of terminal 179.

Contact 177 is connected by wire 180 with generator brush 127, and the terminal 179 is connected by wire 181 with switch terminal 182. Switch terminal 183 is connected by wire 184 with generator terminal 185 which leads to generator fields 151 and thence to the regulating or third brush 131.

The switch battery terminal 190 is connected by wire 191 with ammeter 192 which in turn is connected by wire 193 with battery 170. The switch ignition terminal 194 is connected by wire 195 leading to ignition coil primary 196, ignition resistance 197, grounded timer 198 and ground condenser 199. Ignition coil secondary 197 is connected with ignition distributor 198 which distributes the sparking impulse to the various spark plugs of the engine.

Terminal 190 is connected by wire 200 with interlocking overload circuit breaker 201 which is connected with grounded handy lamp 202, grounded tonneau light 203 and with horn 204 connected with grounded horn button 205.

Terminal 190 is also connected by wire 200 with vibrating overload circuit breaker 206 which in turn is connected with switch terminal 207. Terminals 194, 182, 190 and 207 are connected with stationary contacts 208, 209, 210 and 211 respectively. Terminal 183 is connected with a movable switch contact 212. A movable switch contact 213 is adapted to bridge the contacts 208 and 211. Preferably contacts 212 and 213 are mounted so as to be moved by the same switch lever. Terminal 207 is connected with a movable contact 214 adapted to engage contacts 215, 216 and 217 which are connected with terminals 218, 219 and 220 respectively. Terminal 219 is connected by wire 221 with terminal 222 which may be connected directly with switch terminal 207 by means of a separate switch 223. Terminal 218 is connected by wire 224 with grounded headlights 225. Terminal 219 is connected by wire 226 with grounded dash light 227 and grounded rear light 228. Terminal 220 is connected by wire 229 with grounded side lights 230.

The terminals 172, 179 and 185 are mounted upon the end frame 38 and are grouped together so as to be enclosed by a terminal housing 240 which is arranged to conform with the outer cylindrical surfaces of the motor generator 35 and to be secured thereby by means of screws 241 and 242. Housing 240 comprises a terminal chamber 243 communicating with downwardly extending conductor passages 244 and 245 which are arranged preferably in symmetrical relation. The motor lead 171 may be located in either one of the passages 244 or 245 depending on the location of the battery with respect to the machine 35. The conductors 181 and 184 may be brought out through either of the passages 244 or 245 or may pass out through an opening 246 at the top of the housing 240, and thence through a conduit 247 (see Fig. 1). Conduit 247 is preferably constructed so as to enclose any portions of the conductors 181 and 184 which would remain exposed between the housing 240 and the switch terminals 182 and 183. If the conductors 181 and 184 are not brought out through the opening 246 but out through the passages 244 and 245, the opening 246 may be closed by a suitable plate. It is apparent that by providing the downwardly extending conductor passages 244 and 245 a liability of dirt and moisture coming in contact with the terminals 172, 179 and 185 is reduced.

*Mode of operation.*

To start the engine the switch elements 212 and 213 are turned in a clockwise direction so as to bridge contacts 209, 210 and contacts 208, 211, respectively. The following ignition circuit will be established: battery 170, wire 193, motor 192, wire 191, terminal 190, wire 200, vibrating overload breaker 206, terminal 207, contact 211, switch member 213, contact 208, terminal 194, wire 195, ignition primary coil 196, resistance 197 and grounded timer 198. The following circuit will be established with the generator armature of machine 35: grounded battery 170, wire 193, motor 192, wire 191, terminal 190, contact 210, switch element 212, contact 209, terminal 182, wire 181, terminal 179, switch members 178, and 177, wire 180, generator brush 127 and generator armature and the grounded brush 126. The following generator field circuit will also be established: contact 190, terminal 210, switch element 212, terminal 183, wire 184, terminal 185, field windings 151, third or regulating brush 131, generator armature and the grounded brush 126.

The passage of current from the battery through the circuits just described to machine 35 will produce a slow speed and slow torque rotative movement of the shaft 41. While this movement is taking place pedal 79 is depressed causing the gear 66 to be shifted to the dotted line position 66ª in which it engages the pinion 42, while the gear 62 is shifted to the dotted line position 62ª wherein it engages the flywheel gear 61. Gears 66 and 62 are so arranged with relation to pinion 62 and gear 61 that gear 66 will engage the pinion 42 before gear 62 engages with flywheel gear 61. The slow rotation of shaft 41 facilitates the coupling of pinion 42 with gear 66. The rotation of these gear elements together facilitates the coupling up of gear 62 with flywheel gear 61.

The movement of the shifting lever 73 to the dotted line position 73ª by means of which motion is imparted from the pedal 79 to the gearing 66, 62, causes the rod 112 to move in the dotted line position 112ª (see Fig. 1). This movement of rod 112, by virtue of its cooperation with the slot 111 and the brush cam plate 92 causes said brush cam plate 92 to shift in the dot and dash line position 92ª (see Fig. 6). By the time substantial engagement of the gearing just described has been effected, the stop surfaces 109 and the camming surfaces 110 of the brush cam plate 92 will have moved away from the brush arm rollers 103, 104, 105, 106 to permit the springs 101 to press the motor brushes 97, 98, 99 and 100 into engagement with the motor commutator 43. The lowering of brush 98 into engagement with commutator 43 causes the separation of contacts 177 and 178 thereby breaking the main generator armature circuit. The generator shunt field circuit described will still remain established. The lowering of the motor brushes into engagement with the commutator will also effect the following motor circuit: grounded battery 170, wire 171, terminal 172, branch circuit including wire 173, motor field 150, wire 174 and brush 97, branch circuit including wire 175, motor field 150, wire 176 and brush 99, motor armature and grounded brushes 98 and 100. The establishing of the motor circuit causes the high torque rotation of the motor to effect the starting of the engine. During the starting operation the generator field windings 151 are effective to assist in the starting operation especially in case the machine is compelled to turn very slowly in order to get the engine into operation.

After the engine has become self-operative the pedal 79 is released whereupon the spring 83 restores the lever 73 and the gearing 66, 62 to the full line position shown in Fig. 1. The engine is now free to drive the machine 35 through the gearing 24, 26, 25, 27, 28, 29, shaft 30, coupling elements 31, 33, 34 and the one-way clutch including elements 48 and 46, the latter being connected with shaft 41 by means of driving member 53. During the motor operation this clutch has been inoperative since the clutch shell 46 can drive the clutch cam 48. The release of the pedal 79 also causes the brush cam plate 92 to be returned to the full line position shown in Fig. 6. During the return movement of brush cam 92 the camming surfaces 110 provided thereon engage with the motor brush arm rollers causing the same to ride upon the stop surfaces 109 provided on the brush cam plate 92. This operation will restore the main generator armature circuit whereupon the machine will operate as a generator to charge the battery 170.

To stop the engine the switch elements 212 and 213 which are preferably controlled by a single operating member are moved to circuit opening position, whereupon the circuits between the battery and the ignition apparatus and the generator armature and fields will be broken. In case the engine should stall and the driver should forget to turn off the ignition by turning the switch elements 212 and 213 to open position as shown in Fig. 13, the machine 35 will be driven by the battery 170 as a motor, thereby causing the clutch shell 46 to rotate free of the clutch cam 48. By reason of the notches 58 provided in the clutch shell 46 the clutch rollers 51 will cooperate with these notches to produce a clicking signal, indicating to the operator that the ignition apparatus and the machine 35 has been left connected to the battery. The operation of this clicking one-way clutch is particularly described in the patent to C. F. Kettering and William A. Chryst, No. 1,311,402.

The switch element 214 is used to connect terminal 207 with terminals 218, 219 or 220, while switch 223 may control the circuit to terminal 219. In this manner lamps 225, 227, 228 and 229 are controlled. The translation devices 202 and 203 are controlled in any suitable manner, while horn 204 is controlled by button switch 205.

*Elimination of humming.*

Referring now to Figs. 11 and 12, the function of the pole tips with relation to the armature core teeth will now be described. The relation of the armature core tooth 166 to the V-shaped space between adjacent pole tips 142 and 144 is such that just before a core tooth 166 leaves a trailing pole tip 144, the core tooth will have just slightly moved past the leading pole tip 142. One of these core teeth 166ª is shown in Figs. 11 and 12 to be in this position. It will be noted that core tooth 166ª has just left a trailing tip 144, but has just passed under the adjacent leading pole tip 142 a slight amount. For a machine having the proportions shown in Fig. 11 and having an armature substantially 3.75 inches in diameter, the amount of underlapping shown in Figs. 11 and 12 is preferably one sixteenth of an inch.

The construction and arrangement of pole pieces just described is such as to provide for the gradual removal or shading off by a core tooth from the influence of magnetic flux of one pole piece, and the gradual introduction or shading of the core tooth into the influence of the magnetic field provided by the next succeeding pole. The shading into a region of certain polarity begins before the shading away from a region of opposite polarity ceases.

By virtue of the arrow-shaped pole shoe construction this shading is brought about during a comparatively narrow angle of movement of the armature core tooth, hence it is possible to use a comparatively large per cent of the pole shoe area effectively to carry the magnetic flux into the armature. The result is that humming is substantially eliminated without sacrificing efficiency. In fact, there is an improvement in efficiency over machines using the conventional types of pole shoes.

This shading effect referred to is also assisted by shaping the pole shoes so that the length of the air gap increases as an armature core tooth moves away from a pole core. However, when arrow-shaped pole shoes are used, this air gap need be increased much less rapidly to assist in producing the desired result. As a result of this, the average air gap length can be made much less without causing humming. Therefore, the effective area of the air gap is greater than with conventional types of pole pieces constructed to eliminate humming, hence the operating efficiency of the machine is greater.

What I claim is as follows:

1. In a starting system, the combination with an internal combustion engine and a storage battery; of a dynamo-electric machine operable as a motor to start the engine and having brushes each mounted on a movable brush arm each yieldingly urged toward the motor commutator by a spring; a pivotally mounted brush cam plate provided with projections each cooperating with a brush arm and each provided with a camming surface and with a stop surface normally maintaining a brush out of engagement with the commutator; shiftable gearing for connecting the machine with the engine; means for shifting said gearing including a member cooperating with said brush cam plate to release said brush arms after the gearing has been substantially connected; and spring means for restoring the gear shifting means and the brush cam plate, causing the said camming surfaces to move the brush arms away from the commutator.

2. In a starting system, the combination with an internal combustion engine and a storage battery; of a dynamo-electric machine operable as a motor to start the engine and having brushes each mounted on a movable brush arm each yieldingly urged toward the motor commutator by a spring; a pivotally mounted brush cam plate provided with projections each cooperating with a brush arm and each provided with a camming surface and with a stop surface normally maintaining a brush out of engagement with the commutator, said cam plate being provided with a slot; shiftable gearing for connecting the machine with the engine; a lever for shifting said gearing and provided with a rod engaging said cam plate slot whereby to release said brush arms after the gearing has been substantially connected; and spring means for restoring said gear shifting lever and the brush cam plate, causing the said camming surfaces to move the brush arms away from the commutator.

In testimony whereof I affix my signature.

WILLIAM A. CHRYST.

Witnesses:
 WALTER W. RIEDEL,
 J. W. MCDONALD.